United States Patent
Qin et al.

(10) Patent No.: US 7,639,490 B2
(45) Date of Patent: Dec. 29, 2009

(54) MOUNTING APPARATUS FOR STORAGE DEVICE

(75) Inventors: Xiao-Yong Qin, Shenzhen (CN); Jie Zhang, Shenzhen (CN); Hung-Chun Lu, Taipei Hsien (TW); Hsuan-Tsung Chen, Taipei Hsien (TW); Guang-Yao Lee, Taipei Hsien (TW); Chun-Chi Liang, Taipei Hsien (TW)

(73) Assignees: Hong Fu Jin Precision Industry (ShenZhen) Co., Ltd., Shenzhen City, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 286 days.

(21) Appl. No.: 11/849,304

(22) Filed: Sep. 3, 2007

(65) Prior Publication Data

US 2008/0259554 A1 Oct. 23, 2008

(30) Foreign Application Priority Data

Apr. 17, 2007 (CN) .................... 2007 1 0200473

(51) Int. Cl.
G06F 1/16 (2006.01)
(52) U.S. Cl. ................................. 361/679.34
(58) Field of Classification Search ............. 361/679.34
See application file for complete search history.

(56) References Cited

U.S. PATENT DOCUMENTS

| | | | | | |
|---|---|---|---|---|---|
| 5,673,171 | A | * | 9/1997 | Varghese et al. | 361/679.34 |
| 6,084,768 | A | * | 7/2000 | Bolognia | 361/679.31 |
| 6,166,901 | A | * | 12/2000 | Gamble et al. | 361/679.34 |
| 6,442,021 | B1 | * | 8/2002 | Bolognia et al. | 361/679.34 |
| 6,819,555 | B2 | * | 11/2004 | Bolognia et al. | 361/679.33 |
| 7,006,351 | B2 | * | 2/2006 | Chen et al. | 361/679.34 |
| 7,126,817 | B2 | * | 10/2006 | Li | 361/679.37 |
| 7,440,270 | B2 | * | 10/2008 | Zheng et al. | 361/679.33 |
| 7,486,509 | B2 | * | 2/2009 | Kim et al. | 361/679.34 |
| 7,495,904 | B2 | * | 2/2009 | Liang et al. | 361/727 |
| 2005/0088778 | A1 | * | 4/2005 | Chen et al. | 360/97.02 |
| 2007/0075194 | A1 | * | 4/2007 | Lan et al. | 248/27.5 |
| 2007/0145214 | A1 | | 6/2007 | Lin et al. | |
| 2007/0164170 | A1 | * | 7/2007 | Huang et al. | 248/27.1 |
| 2007/0235625 | A1 | * | 10/2007 | Liang et al. | 248/675 |
| 2008/0017778 | A1 | * | 1/2008 | Fan et al. | 248/539 |
| 2008/0019091 | A1 | * | 1/2008 | Fan et al. | 361/685 |

* cited by examiner

*Primary Examiner*—Lisa Lea-Edmonds
(74) *Attorney, Agent, or Firm*—Frank R. Niranjan

(57) ABSTRACT

A mounting apparatus includes a bracket, a frame slidably received in the bracket, a fixing member mounted inside the frame for fixing a storage device to the frame, at least one gasket, and at least one fastener for extending through the at least one gasket and the frame to engage with the fixing member, the at least one gasket dampening vibrations transmitted from the frame to the storage device along the at least one fastener and the fixing member.

20 Claims, 3 Drawing Sheets

MOUNTING APPARATUS FOR STORAGE DEVICE

BACKGROUND

1. Field of the Invention

The present invention relates to mounting apparatuses, and more particularly to a mounting apparatus for a storage device.

2. Description of Related Art

An electronic apparatus, such as a typical desktop computer, a tower computer, a server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is labor-intensive.

The installation of a hard disk drive in a computer typically involves the use of screws to attach the hard disk drive to a bracket of a computer chassis. However, these screws are usually too small and difficult to handle. Additionally, because of their small size, the screws are easily dropped, by an assembler, into the computer.

To address the aforementioned problems, a plurality of mounting apparatuses is invented to reduce the number of needed screws. For example, a pair of detachable rails is attached to opposite sides of a storage device with screws. The storage device is then slid into and secured to a drive bracket. However, because the screws are directly engaged in the rails and the storage device, the storage device is apt to be damaged by vibrations transmitted through the screws.

What is needed, therefore, is a mounting apparatus which is able to provide better protection to a storage device.

SUMMARY

An exemplary mounting apparatus includes a bracket, a frame slidably received in the bracket, a fixing member mounted inside the frame for fixing a storage device to the frame, at least one gasket, and at least one fastener for extending through the at least one gasket and the frame to engage with the fixing member, the at least one gasket dampening vibrations transmitted from the frame to the storage device along the at least one fastener and the fixing member.

Other advantages and novel features will become more apparent from the following detailed description of embodiment when taken in conjunction with the accompanying drawings, in which:

DETAILED DESCRIPTION

Figure 1:
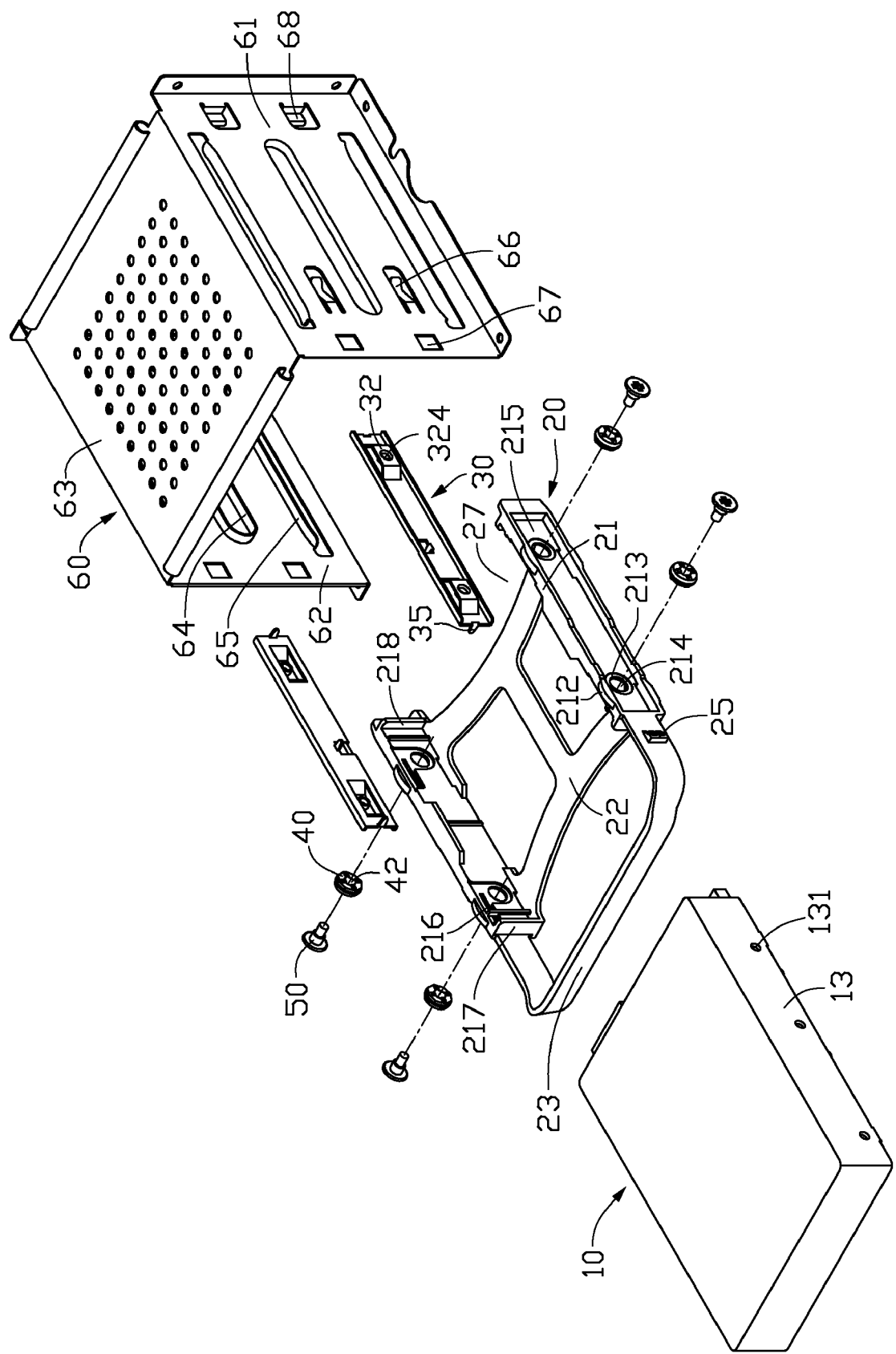
FIG. 1 is an exploded, isometric view of a mounting apparatus with a storage device in accordance with an embodiment of the present invention.

Referring to FIG. 1, a mounting apparatus for a storage device is provided in accordance with an embodiment of the present invention. The mounting apparatus includes a frame 20 for receiving a storage device 10, two fixing members 30, four shockproof gaskets 40, four screws 50, and a bracket 60. Each gasket 40 defines a through hole 42 therein. In this embodiment, the gaskets 40 are rubber gaskets, and the screws 50 are stepped screws.

The storage device 10 includes two lateral sides 13, and each lateral side 13 defines three spaced fixing holes 131 therein.

The frame 20 is made of plastic material. The frame 20 includes two opposite elastic arms 21 each having a first end and a second end, a generally H-shaped supporting portion 22 connecting with bottom portions of the elastic arms 21, and a U-shaped elastic handle 23 connecting with first ends of the elastic arms 21. An opening 27 is defined in the frame 20 between the second ends of the elastic arms 21. Two wedge-shaped blocks 25 are formed on the handle 23 adjacent to the elastic arms 21 respectively. Each elastic arm 21 includes a top surface, a bottom surface, and an outside surface. Each of the top surface and the bottom surface forms two spaced arcuate flanges 212 thereon, and each elastic arm 21 defines a concave portion 215 in the outside surface thereof. Each concave portion 215 defines two spaced stepped holes therein. Each stepped hole includes a recessed first hole 213 in communication with the concave portion 215, and a second hole 214 in communication with the first hole 213. The second hole 214 is smaller in diameter than the first hole 213. Two slots 216 are defined in each elastic arm 21 adjacent to each stepped hole. Two stop plates 217, 218 are formed on an inside surface of each elastic arm 21 adjacent to the first and second end thereof respectively.

Each fixing member 30 forms two outwardly bent bridge-shaped fixing portions 32, corresponding to the second holes 214 of the elastic arms 21 of the frame 20, and a threaded hole 324 is defined in a post inwardly punched from a middle section of each fixing portion 32. Three spaced pins 35 are perpendicularly formed on an inside surface of each fixing member 30, for engaging in the fixing holes 131 of the corresponding lateral side 13 of the storage device 10.

The bracket 60 includes a first sidewall 61, a second sidewall 62 opposite to the first sidewall 61, and a top wall 63. Two spaced sliding rails 64, 65 are formed on an inner side of each of the first sidewall 61 and the second sidewall 62, parallel to the top wall 63 of the bracket 60. An inward bent elastic tab 66 extends from the first sidewall 61 between the sliding rails 64, 65. Each of the first sidewall 61 and the second sidewall 62 defines an engaging slot 67 adjacent to one end thereof between the sliding rails 64, 65, and forms an inward bent L-shaped latching portion 68 adjacent to the other end thereof between the sliding rails 64, 65.

Figure 2:
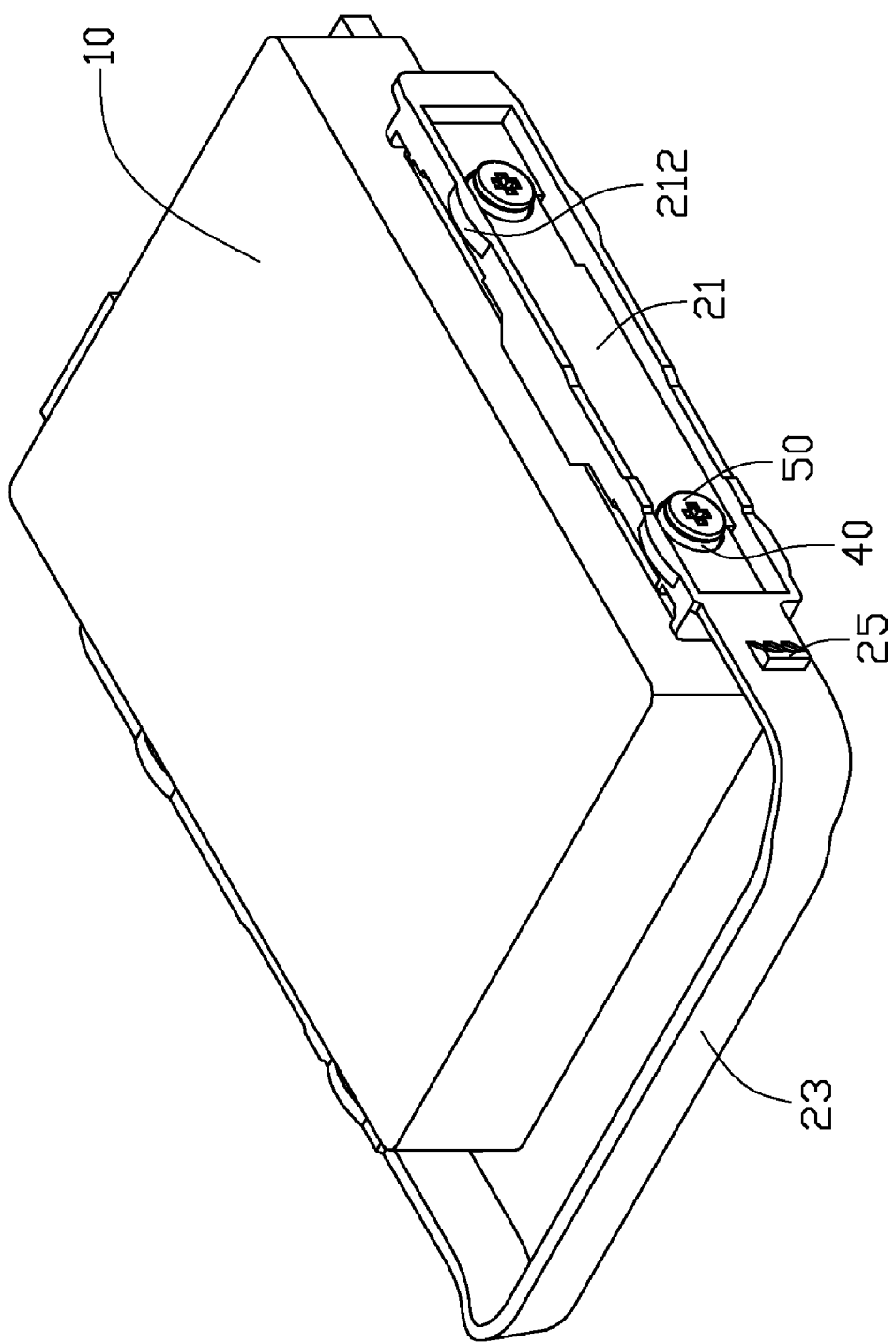
FIG. 2 is a partially assembled view of FIG. 1.

Referring further to FIG. 2, in assembly, each fixing member 30 is received between the stop plates 217, 218 of the corresponding elastic arm 21, the fixing portions 32 of each fixing member 30 adjoin the inside surface of the corresponding elastic arm 21 of the frame 20, with the threaded holes 324 of the fixing portions 32 aligning with the second holes 214 of the corresponding elastic arm 21 respectively. The gaskets 40 are attached in the first holes 213 of the stepped holes of the elastic arms 21 respectively. The screws 50 are extended through the through holes 42 of the gaskets 40 and the second holes 214 of the elastic arms 21 respectively, and engage in the corresponding threaded holes 324 of the fixing members 30. Thereby, the fixing members 30 are fixed to the elastic arms 21 of the frame 20 respectively. The elastic arms 21 of the frame 20 are deformed outward to allow the storage device 10 to be received in the frame 20, with the fixing holes 131 of the lateral sides 13 of the storage device 10 aligning with the pins 35 of the fixing members 30 respectively. Thereafter, the elastic arms 21 are released and rebound, which makes the pins 35 engage in the corresponding fixing holes 131 of the storage device 10. Thereby, the storage device 10 is fixed in the frame 20.

Figure 3:
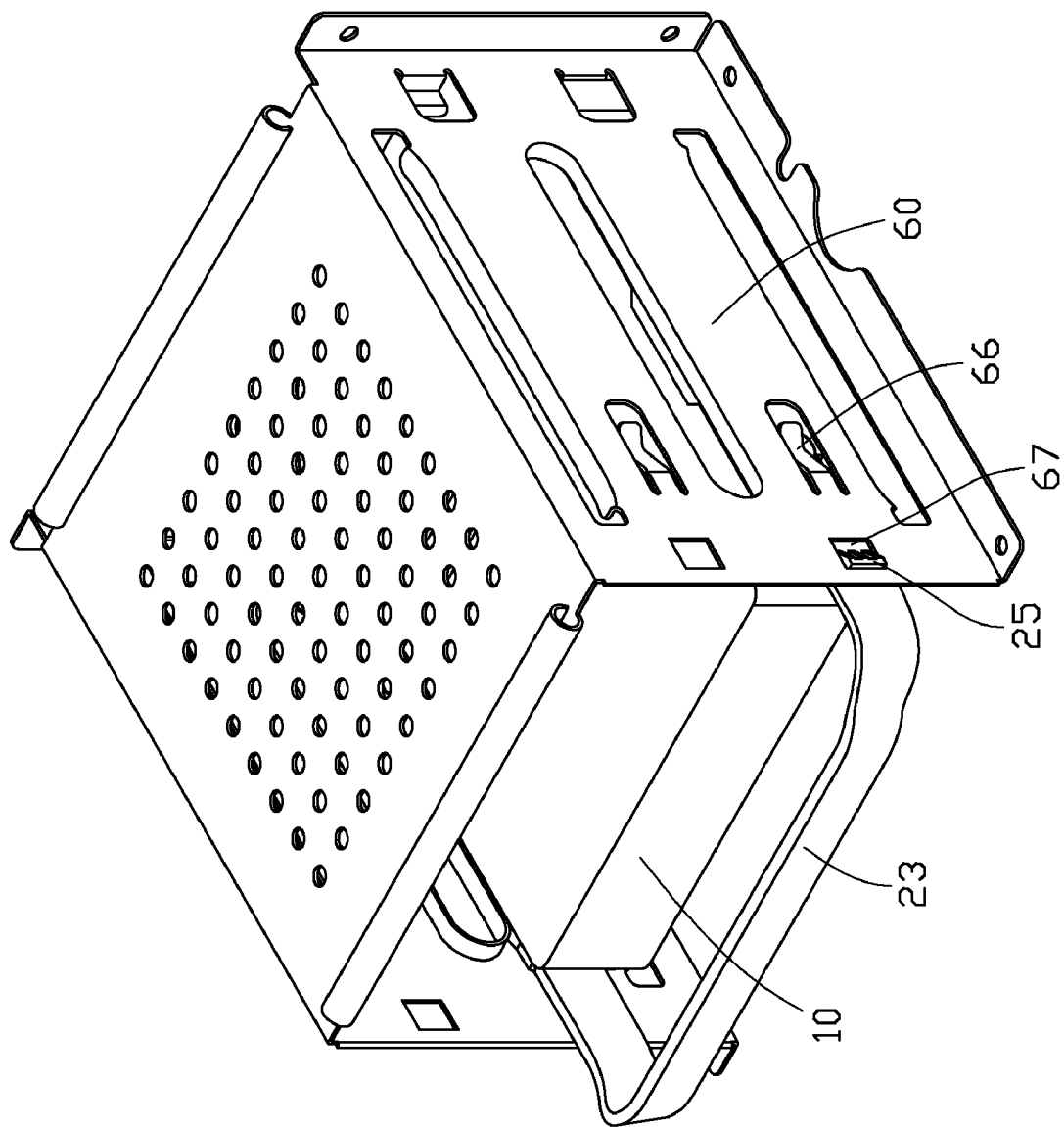
FIG. 3 is an assembled view of FIG. 1.

Referring further to FIG. 3, the frame 20 together with the storage device 10 are pushed to slide into the bracket 60, with the elastic arms 21 of the frame 20 received between the corresponding sliding rails 64, 65 of the bracket 60, and the arcuate flanges 212 of the elastic arms 21 abutting against the corresponding sliding rails 64, 65. The elastic arm 21 toward the first sidewall 61 of the bracket 60 presses the elastic tab 66 of the first sidewall 61, and makes the elastic tab 66 deform outward. When the blocks 25 of the frame 20 contacts the first and second sidewalls 61, 62 of the bracket 60 respectively, the handle 23 of the frame 20 is compressed to deform by the first and second sidewalls 61, 62 of the bracket 60 to allow the blocks 25 to enter the bracket 60. The frame 20 is pushed further, until the second ends of the elastic arms 21 abut against the latching portions 68 of the first and second sidewalls 61, 62 respectively, then the handle 23 is restored to make the blocks 25 engage in the engaging slots 67 of the first and second sidewalls 61, 62 respectively. Thereby, the frame 20 and the storage device 10 are fixed to the bracket 60 in a locked position where the L-shaped latching portions 68 block the corresponding second ends of the frame 20 to stop the combined bracket 60 and storage device 10 from moving inward, the blocks 25 engage in the corresponding engaging slots 67 to stop the combined bracket 60 and storage device 10 from moving outward, and the handle 23 is left outside of the bracket 60. The elastic tab 66 of the first sidewall 61 abuts against the corresponding screw 50 of the elastic arm 21 of the frame 20, which is able to protect the storage device 10 from vibrations.

To detach the storage device 10, the handle 23 of the frame 20 is squeezed to disengage the blocks 25 from the engaging slots 67 of the first and second sidewalls 61, 62 of the bracket 60 respectively. The frame 20 and the storage device 10 are then pulled out of the bracket 60. Thereafter, the elastic arms 21 of the frame 20 are deformed away from each other, to disengage the pins 35 of the fixing members 30 from the fixing holes 131 of the storage device 10 respectively. Thereby, the storage device 10 is ready to be detached from the frame 20.

The gaskets 40 used in this embodiment may dampen vibrations transmitted from the frame 20 to the storage device 10 along the fasteners 50 and the fixing members 30 to thereby protect the storage device 10 from being damaged.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A mounting apparatus for a storage device, the mounting apparatus comprising:
   a bracket;
   a frame slidably receivable in the bracket;
   a fixing member mounted inside the frame for fixing the storage device to the frame;
   at least one gasket; and
   at least one fastener configured for extending through the at least one gasket and the frame to engage with the fixing member, the at least one gasket structured and arranged for dampening vibrations transmitted from the frame to the storage device along the at least one fastener and the fixing member.

2. The mounting apparatus as claimed in claim 1, wherein the frame comprises two elastic arms and another fixing member, the two fixing members being mounted to the elastic arms respectively, each of the elastic arms defines a stepped hole having a recessed first hole, each of the fixing members defines a threaded hole aligning with the corresponding stepped hole of the elastic arm, the at least one gasket comprises two gaskets attached in the first holes, and the at least one fastener comprises two screws configured for passing through the corresponding gaskets and stepped holes and engaging in the corresponding threaded holes of the fixing members.

3. The mounting apparatus as claimed in claim 2, wherein each of the fixing members forms an outward bent bridge-shaped fixing portion for abutting against the corresponding elastic arm, the threaded hole is defined in a post which protrudes inward from the fixing portion.

4. The mounting apparatus as claimed in claim 2, wherein at least one slot is defined in each of the elastic arms adjacent to the corresponding stepped hole for increasing the elasticity of the elastic arms.

5. The mounting apparatus as claimed in claim 2, wherein the frame further comprises a supporting portion connecting with bottom portions of the elastic arms, for supporting the storage device.

6. The mounting apparatus as claimed in claim 5, wherein the bracket comprises two sidewalls each forming two spaced sliding rails on an inner side thereof, the frame is slidably received between the sliding rails of the sidewalls.

7. The mounting apparatus as claimed in claim 6, wherein an inward bent elastic tab extends from one of the sidewalls, for abutting against a corresponding screw when the frame is received in the bracket.

8. The mounting apparatus as claimed in claim 6, wherein an engaging slot is defined in each of the sidewalls adjacent to an end thereof, the frame comprises a handle connecting with the elastic arms, and two wedge-shaped blocks are formed on the handle adjacent to the elastic arms respectively, for engaging in the corresponding engaging slots of the sidewalls to stop the frame from moving outward when the frame is received in the bracket.

9. The mounting apparatus as claimed in claim 8, wherein an inward bent latching portion is formed on each of the sidewalls adjacent to an opposite end thereof, for abutting against the frame to stop the frame from moving inward when the frame is received in the bracket.

10. The mounting apparatus as claimed in claim 6, wherein each of the elastic arms comprises a top surface, and a bottom surface, each of the top surface and the bottom surface forms two spaced arcuate flanges for contacting the corresponding sliding rail of the corresponding sidewall.

11. The mounting apparatus as claimed in claim 1, wherein the fixing member forms at least one pin for latching the storage device.

12. A mounting apparatus for a storage device, the mounting apparatus comprising:
   a bracket comprising two sidewalls each forming two spaced sliding rails on an inner side thereof, an inward bent elastic tab extending from one of the sidewalls;
   a frame comprising two elastic arms slidably receivable in the bracket between the sliding rails of the sidewalls, the elastic tab of the bracket abutting against a corresponding side of the frame for absorbing vibration when the frame is received in the bracket;
   two fixing members receivable in the frame for fixing the storage device in the frame, each of the fixing members forming an outward bent bridge-shaped fixing portion for abutting against the corresponding elastic arm; and a plurality of fasteners extending through the elastic arms and engaging with the fixing portions respectively for fixing the fixing members to the frame.

13. The mounting apparatus as claimed in claim 12, wherein each of the elastic arms defines two stepped holes each having a first hole, each of the fixing members defines two threaded holes aligning with the corresponding stepped holes of the elastic arm, a gasket is received in each of the first holes, each of the gaskets defines a through hole therein, and the fasteners are extended through the gaskets and stepped holes respectively and engage in the corresponding threaded holes of the fixing members.

14. The mounting apparatus as claimed in claim 12, wherein the elastic tab abuts against a corresponding fastener of the frame when the frame is received in the bracket.

15. The mounting apparatus as claimed in claim 12, wherein an engaging slot is defined in each of the sidewalls adjacent to an end thereof, the frame comprises a handle connecting with the elastic arms, and two wedge-shaped blocks are formed on the handle adjacent to the elastic arms respectively, for engaging in the corresponding engaging slots of the sidewalls.

16. A combination comprising:

a storage device;

a pair of fixing members attached to opposite sides of the storage device;

a frame configured for receiving the storage device, the frame comprising a pair of arms configured for attaching the fixing members thereon, the frame being deformable to move the arms away from each other to allow the combined storage device and fixing members being received therebetween; and at least one dampening structure attached between the frame and the fixing members configured for dampening vibration transmitted from the frame to the fixing members.

17. The combination as claimed in claim 16, wherein each of the arms defines a stepped hole which comprises a large portion and a small portion, the at least one dampening structure comprises a pair of gaskets each being received in the large portion of a corresponding stepped hole, a pair of fasteners extend respectively through the gaskets and the small portions of the stepped holes to engage with the corresponding fixing members.

18. The combination as claimed in claim 17, wherein each of the arms forms a pair of stop plates for guiding the corresponding fixing member sliding into the frame and restricting the corresponding fixing member therebetween.

19. The combination as claimed in claim 17, further comprising a bracket which comprises a pair of sidewalls, wherein the arms of the frame are capable of sliding into the bracket along the sidewalls respectively.

20. The combination as claimed in claim 19, wherein each of the sidewalls defines an engaging slot and the frame further comprises a handle connected between ends of the arms, an inward bent latching portion being formed on each of the sidewalls for abutting against the frame to stop the frame from moving inward, and two wedge-shaped blocks being formed on the handle adjacent to the arms respectively for engaging in the corresponding engaging slots of the sidewalls to stop the frame from moving outward.

\* \* \* \* \*